United States Patent [19]

Dziemba

[11] Patent Number: 4,544,151

[45] Date of Patent: Oct. 1, 1985

[54] TRANSFER DEVICE FOR FILM CARD

[75] Inventor: Peter Dziemba, Bad Nauheim, Fed. Rep. of Germany

[73] Assignee: MAP Mikrofilm Apparatebau Dr. Poehler GmbH & Co., KG, Fed. Rep. of Germany

[21] Appl. No.: 541,583

[22] Filed: Oct. 13, 1983

[30] Foreign Application Priority Data

Oct. 27, 1982 [DE] Fed. Rep. of Germany ....... 3239703

[51] Int. Cl.$^4$ .............................................. B65H 9/16
[52] U.S. Cl. ..................................... 271/251; 271/272
[58] Field of Search ............... 271/251, 113, 272, 273, 271/274, 163; 226/182

[56] References Cited

U.S. PATENT DOCUMENTS 3,107,090 10/1963 Templeton ........................... 271/251
3,175,824 3/1965 Albosta ........................... 271/272 X
4,447,053 5/1984 Wager ................................. 271/113

FOREIGN PATENT DOCUMENTS 2524359 12/1975 Fed. Rep. of Germany ...... 271/251

OTHER PUBLICATIONS

IBM Technical Disclosure Bulletin, vol. 16, No. 11, pp. 3676, 3677, Apr. 1974, J. Gutteling.

Primary Examiner—Richard A. Schacher
Attorney, Agent, or Firm—Cantor and Lessler

[57] ABSTRACT

A transfer device to transport a film card from a film platform of a microfilm reading machine to a cassette and in the reverse direction has a transport device which has two mutually opposite rotary disks which are approachable towards each other like the jaws of tongs. This transport device is capable of moving towards the film card, so that the film card passes between the disks. One of the disks is driven so that the film card is transported as soon as it passes between the disks. Due to the arrangement of a pair of disks, the transport device is extremely flat so that it can withdraw a film card from a cassette without the need for it to be slid into the induction region of the transport device by means of, for example, a ram.

11 Claims, 5 Drawing Figures

TRANSFER DEVICE FOR FILM CARD

BACKGROUND OF THE INVENTION

This invention relates to a transfer device for transmitting a film card or a comparable object, guided between two guides from one position into another, for example, for transmitting a film card from a film platform into a film cassette.

In microfilm reading machines, it has been customary for a long time to move the film platform mechanically, so that a picture selected by means of a keyboard can be moved automatically in front of the objective. Further developed microfilm reading machines have also already appeared on the market, in which an automatic selective film card exchange between the film platform and a magazine is possible. In one such type of machine, the film cards are stored in a carousel. Each film card is provided with a clip exhibiting a coding in the form of notches, whereby selection is possible. Then, by a relatively complicated mechanism, the respective film card desired is withdrawn from the carousel and moved into the projection device, after the film card present there has previously been transported into the magazine.

In another type of machine, the film cards are kept in foil envelopes. They are stored, and slid into the film platform, in these foil envelopes. The foil envelopes have lugs, similar to index cards, by means of which selection is made. Experience has shown that such foil envelopes readily become scratched themselves and also scratch the film card. They also lead to a milky, blurred image in the microfilm reading machine and are the cause of Newtons rings.

Such problems could be avoided if, for example, a magazine constructed as a cassette was arranged vertically mobile and the respective film cards could simply be slid from the magazine in a straight line into the film platform and, conversely, a film card from the film platform slid in a straight line into the magazine. It would then be possible to omit a coding on the film cards and simple to move the magazine into that position in which the desired film card is aligned with the film platform.

A device of this type with film cards guided upright in slots is likewise known. However, the configuration of the transfer device is a problem with such a device. One generally thinks of a pair of rollers to transport the film cards, as in the case of copying machines, for example. However, since from considerations of space such a pair of rollers cannot grip between the stored film cards and extract a film card, a ram is additionally required which slides the respective film card out of the magazine into the induction region of the pair of rollers. A device must also be provided which slides the film card, after it leaves the pair of rollers, into a limit position on the film magazine, or into the magazine in the inverse transport direction. Because the film cards are frequently extremely thin, difficulties arise in sliding them reliably with rams. Moreover, the movement of the rams must be coordinated and monitored, which dictates substantial structural outlay.

SUMMARY OF THE INVENTION

The primary object of the present invention is to produce a transfer device of the type initially stated, which has a particularly simple and space-saving configuration and transports film cards or comparable objects with the least possible friction, so that jamming cannot occur, as occurs continually in the transport of paper in copying machines, for example.

This object is achieved according to the invention by providing a transfer device for transmitting a film card or the like guided between two guides from one position to another comprising transport means for gripping and transporting the film card movable transversely to the film card and having two opposed rotary disks movable towards the film card and mounted at an acute angle with respect to each other when in a gripping position. At least one disk is provided with means to rotate the same. The preferred rotating means is a motor. The rotating means is reversible whereby the film card can be moved into or out of the magazine. The device is disposed at the transfer end of one of the guides.

Inasmuch as the transfer device according to the invention has two disks standing at an acute mutual angle instead of rollers arranged superposed, it has only a small overall height, so that it is capable of moving into a cassette-shaped magazine between stored film cards. Consequently, the transfer device can grip the film cards there directly so that the use of additional transport means, such as rams, for example, can be omitted.

It is also advantageous that the transfer device grips and transports the film card on one side only. The film card is, therefore, not touched where it contains data so that no scratching of the important region of the film card can occur.

Because the transfer device leaves the transfer region completely clear apart from a narrow lateral region, an automatic monitoring of this transfer region by optical-electronic sensors can easily be realized.

Apart from microfilm reading machines, the transfer device according to the invention may also be used for numerous other devices. For example, it could be used in a device for loading a film card cassette.

The transfer device according to the invention makes it possible to conform a cassette for film cards so that it is open towards one side only. Such a cassette can easily be gripped by its two lateral walls and inserted into a microfilm reading machine. Its rear wall is fully available for labelling.

A further advantage of the transfer device according to the invention is that only a single unit in it need be moved and driven. No mechanisms which have to be arranged and driven mutually physically separately, and are difficult to coordinate in their movement cycle, are required.

The advantageous embodiment of the invention, wherein only one disk rotates and the other disk has limited pivotability in the respective direction of rotation transverse to the clamping plane, has the result that, during the transport of a film card, the two disks are braced upon each other through the film card clamped between them so that the film card is not slid precisely parallel to its guides, but is simultaneously pressed somewhat towards that guide which lies on the side of the transfer device. Apart from the moment of induction into the pair of disks, therefore, the film card slides along the guide on the same side as the pair of disks. Jamming of the film card in its guide is efficaciously prevented by this means, even if the film card has considerable play in its guides due to width tolerances. Conversely, if the pair of disks were to press the film card against the opposite guide, then the film card would become stuck there and bulge towards the center.

As will be described below, it is an easy technical matter to arrange that when the direction of rotation is changed the upper disk tilts into the correct position so that no complicated control means or mechanism is necessary.

Even if jamming of a film card should occur, the stuck film card can easily be removed manually if the transfer device is located outside the path of movement of the film cards, because in this case no drive elements, or the transfer device itself, are present in the transport path of the film card. The film card is, therefore, always easily accessible. The electrical control means of the transfer device may be arranged so that, when a film card is stuck, the control means is deenergized and the transfer device then pivots out of the movement path of the film card.

When the transfer device moves into a cassette with film cards, pawls associated with the disks press the adjacent film cards away so that the pair of disks in the transfer device can grip the selected film card.

BRIEF DESCRIPTION OF THE DRAWINGS

The invention is capable of numerous embodiments. In order to clarify it, one of these is illustrated very diagrammatically in the drawings and is described below. In the drawings.

DESCRIPTION OF THE PREFERRED EMBODIMENT

Figure 1:
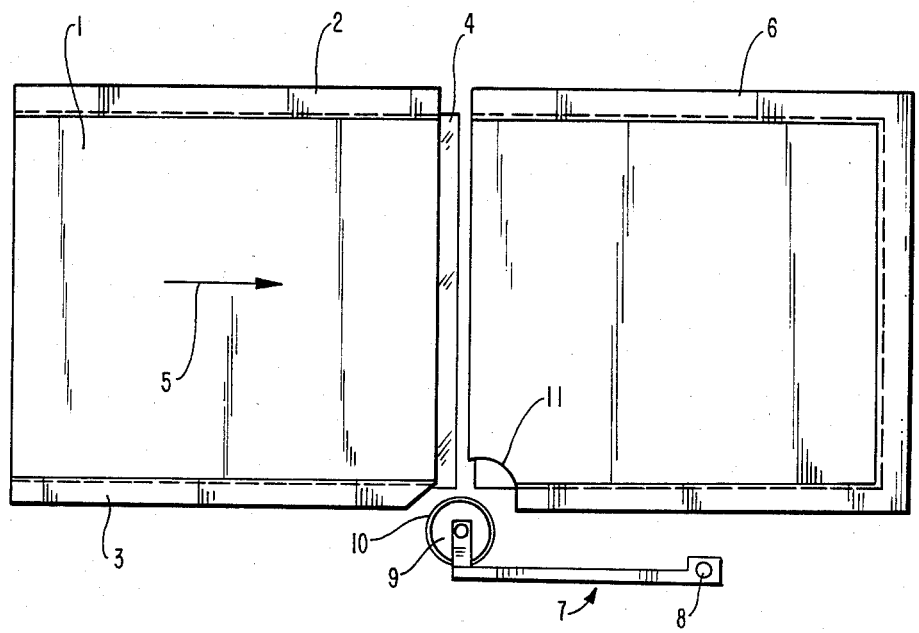
FIG. 1 is a diagrammatic plan view of a film platform of a microfilm reading machine and a film card cassette showing the transfer device according to the invention.

FIG. 1 shows diagrammatically in the left-hand part a film platform 1, which has guides 2, 3 on the two opposite sides. These guides 2, 3 retain a film card 4, also called a microfiche, upon the film platform 1 slidably in the direction of the arrow 5.

A cassette 6, into which film cards 4 can be slid juxtaposed similarly to the slides in a slide magazine, is arranged beside the film platform 1. The cassette 6 is vertically mobile perpendicular to the plane of the drawing, so that any desired film card 4 in the cassette 6 can be brought into a position of alignment with the film platform 1.

A transport device 7 is present on one side of the film platform 1 immediately in front of the guide 3 and in front of the cassette 6. It is pivotable about an axis 8, so that two disks 9, 10 can grip the film card 4 and transport it into the cassette 6. The cassette 6 has an arcuate recess 11 in the corner on the side facing the transport device 7 so that the transport device 7 can transport film cards into the cassette 6 and withdraw them from the cassette.

Figure 2:
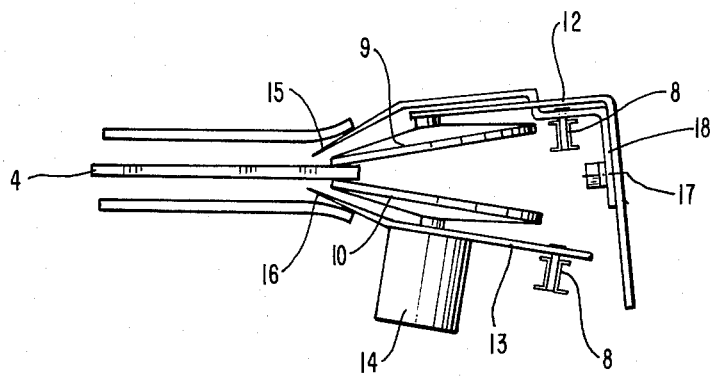
FIG. 2 is a side elevational view of the front part of the transfer device.
Figure 3:
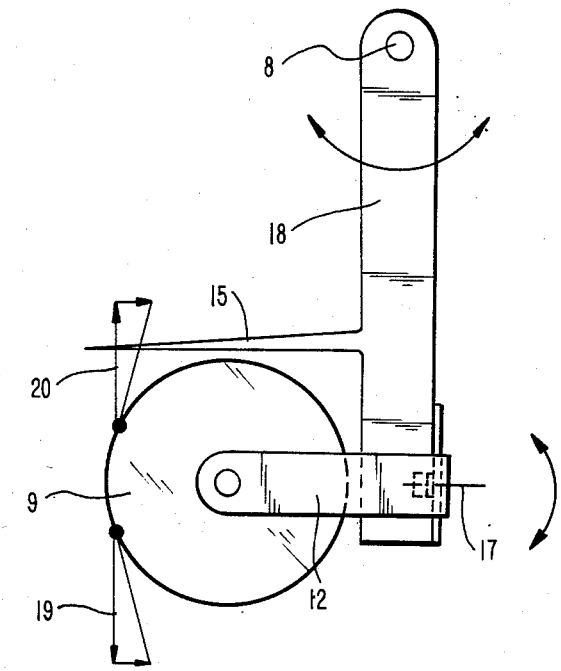
FIG. 3 is a plan view of the arrangement according to FIG. 2.

The more detailed appearance and function of the transport device 7 may be seen more clearly from FIGS. 2 and 3. The transport device 7 is constructed as tongs and has two jaws 12, 13, which are mutually approachable as in the case of any other tongs, which may occur either by an articulation or any desired other means well-known in the art. The upper jaw 12 supports rotatably the disk 9, whereas the lower jaw 13 supports rotatably the disk 10. The latter is driven selectively in one or the other direction of rotation by a motor 14. To enable the two adjacent film cards in a cassette 6 to be spread away when the film card 4 is gripped so that the disks 9, 10 can grip the film card 4, a pawl 15, 16, which tapers forward, that is to say, towards the film card in each case, is associated with each of the jaws 12, 13. FIG. 2 also shows that the planes of the disks 9 and 10 stand mutually at an acute angle when a film card 4 is gripped.

Figure 4:
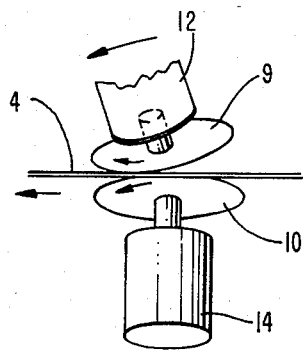
FIGS. 4 and 5 show a view of the front part of the transfer device, viewed from the microfilm, shown in perspective, the microfilm transport device being in different positions in the two illustrations.

Another essential feature of the invention is illustrated in FIGS. 3 and 4. Apart from its pivotability in the clamping plane, the disk 9 is also limitedly pivotable to both sides about an axis 17 transversely to the clamping plane. This has the result that the bracing point of the disk 9 through the film card 4 upon the disk 10 is shifted somewhat in the respective direction of transport as indicated in FIG. 3. Consequently, the disks 9 and 10 exert forces upon a film card 4, not precisely in the transport direction, but somewhat towards the transport device 7. These conditions have been indicated by two force diagrams 19, 20. Due to this shifting of the pressure points, the respective film card 4 is retained against these guides on the side of the transport device 7.

In the concrete embodiment illustrated, the jaw 12 is attached pivotably to one arm of a lever 18. The other arm of this lever 18 is articulated to a fixed component at the axis 8. Correspondingly, the jaw 13 is articulated by means of a lever to a fixed component, whilst the axes of the articulation points are oriented so that the jaws 12, 13 approach mutually when they are pivoted towards the film card 4.

Figure 5:
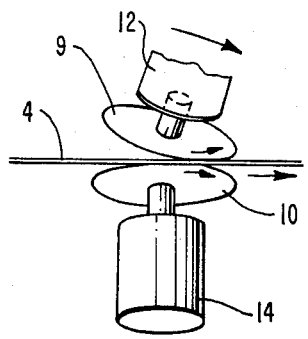

The function of the transfer device may be seen clearly in FIGS. 4 and 5. In the illustration in FIG. 4, the motor 14 rotates in such a direction of rotation that the film card 4 is transported to the left as viewed in the drawing. The disk 9 has been pivoted about the axis 17 shown in FIGS. 2 and 3 by the pivoting of the jaw 12 so that it is braced upon the film card 4 at a point which is somewhat offset in the transport direction relative to the center line of the disk 10.

When the transport device is reversed, the jaw 12 with the disk 9 is then pivoted in the inverse direction which is shown in FIG. 5. The pivoting occurs about the axis 17 in each case and may be effected by means of a simple solenoid and of a traction spring, in that the traction spring draws the jaw into one limit position and the solenoid, when energized, into the other limit position. It is also conceivable to arrange the axis 17 so that the jaw 12 spontaneously pivots to the correct side when the transport direction is reversed.

It should be apparent from the foregoing detailed description that the objects set forth hereinabove have been successfully achieved. Moreover, while there is shown and described a present preferred embodiment of the invention, it is to be distinctly understood that the invention is not limited thereto, but may be otherwise variously embodied and practiced within the scope of the following claims.

What is claimed is:

1. A transfer device for transmitting a film card or the like guided between two guides from one position to another substantially in a single plane, comprising transport means movable transverse to the film card about a pivot axis from a first, rest, position to a second, gripping, position, for gripping and transporting the film card; two opposed rotary disks carried by said transfer means and movable towards each other to grip the card therebetween, said discs being mounted at an acute angle with respect to each other when in the gripping position; and means to rotate at least one of said discs with a reversible direction of rotation; said device being disposed at the transfer end of one of said guides.

2. A transfer device as claimed in claim 1, wherein one disk is provided with said rotating means, the other disk being arranged with limited pivotability in the respective direction of rotation transverse to the clamping plane.

3. A transfer device as claimed in claim 2, wherein the transport means in the rest position is maintained outside the movement path of the film card by spring force.

4. A transfer device as claimed in claim 1, wherein the transport means in the rest position is maintained outside the movement path of the film card by spring force.

5. A transfer device as claimed in claim 1, wherein the transport means comprises a pair of opposed jaws on which said disks are mounted, and a pawl mounted externally on each of the jaws facing the film card and tapering towards the film card.

6. A transfer device as claimed in claim 1, wherein the rotating means is a motor.

7. A transfer device as claimed in claim 1, wherein said film card is guided between a cassette which holds a plurality of film cards and is movable in a direction perpendicular to said plane to locate a desired film card in said plane, and a film platform of a microfilm reading machine.

8. A transfer device as claimed in claim 7, wherein said device is further disposed near one corner of said cassette.

9. A transfer device as claimed in claim 1, wherein the transport means in the rest position is maintained outside the movement path of the film card.

10. A transfer device as claimed in claim 2, wherein the transport means in the rest position is maintained outside the movement path of the film card.

11. A transfer device as claimed in claim 2, wherein the transport means comprises a pair of opposed jaws on which said discs are mounted, and a pawl mounted externally on each of the jaws facing the film card and tapering towards the film card.

* * * * *